United States Patent [19]

Hannah et al.

[11] 4,236,266
[45] Dec. 2, 1980

[54] COLLAPSIBLE AUTOMOTIVE TOOL

[76] Inventors: Frank E. Hannah, Rte. 1, Box 591, Canton; Ronnie L. Hannah, 820 Chestnut Park Dr., Waynesville, both of N.C.

[21] Appl. No.: 8,069

[22] Filed: Jan. 31, 1979

[51] Int. Cl.³ .......................................... B25B 13/00
[52] U.S. Cl. .................................. 7/100; 81/177 B; 81/177 E
[58] Field of Search .................... 7/100, 138, 143; 81/177 A, 177 B, 177 E, 177 G, 177.8, 177.9

[56] References Cited

U.S. PATENT DOCUMENTS

| D. 178,035 | 6/1956 | Bolser. | |
|---|---|---|---|
| 1,689,585 | 10/1928 | Haschart. | |
| 2,394,845 | 2/1946 | Cothern. | |
| 2,518,139 | 8/1950 | Hallowell et al. | 81/177 G X |
| 2,644,359 | 7/1953 | Lydle | 81/177 B |
| 3,587,366 | 6/1971 | Klein et al. | |
| 3,742,790 | 7/1973 | Galley. | |

FOREIGN PATENT DOCUMENTS

| 253069 | 7/1964 | Australia | 81/177 B |
|---|---|---|---|
| 2059178 | 6/1972 | Fed. Rep. of Germany | 81/177 B |

Primary Examiner—James G. Smith
Attorney, Agent, or Firm—Bell, Seltzer, Park & Gibson

[57] ABSTRACT

A collapsible tool for rotating a threaded member on a receiving threaded member and adapted to perform a plurality of mechanical operations associated with the removal and replacement of an automobile tire and wheel assembly. The tool includes a pair of pivotally interconnected arms disposed in a crossing relationship and having a manually releasable spring detent which locks the arms in a perpendicular open position for use of the tool as a wrench. On at least one arm end is mounted a socket for releasably engaging a lug nut, and a curved claw and hammer head are carried by other arm ends for removing and replacing wheel covers.

9 Claims, 7 Drawing Figures

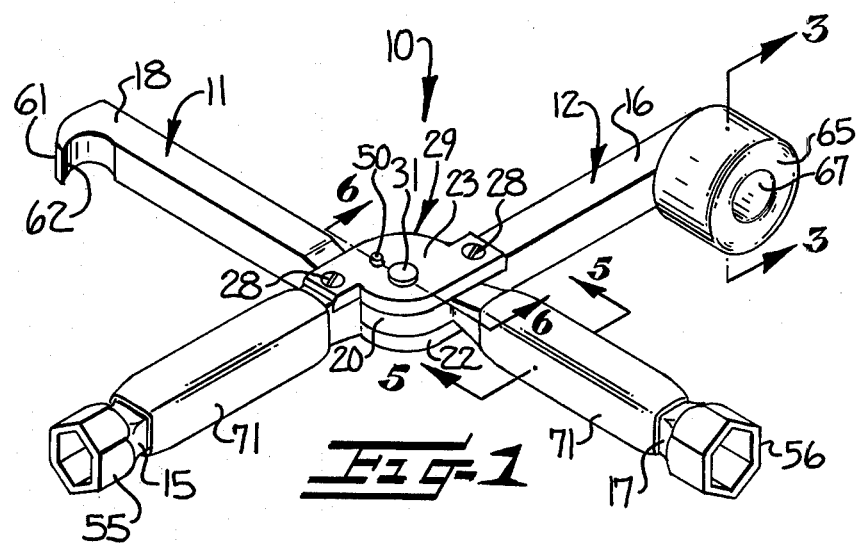

U.S. Patent Dec. 2, 1980 Sheet 2 of 2 4,236,266
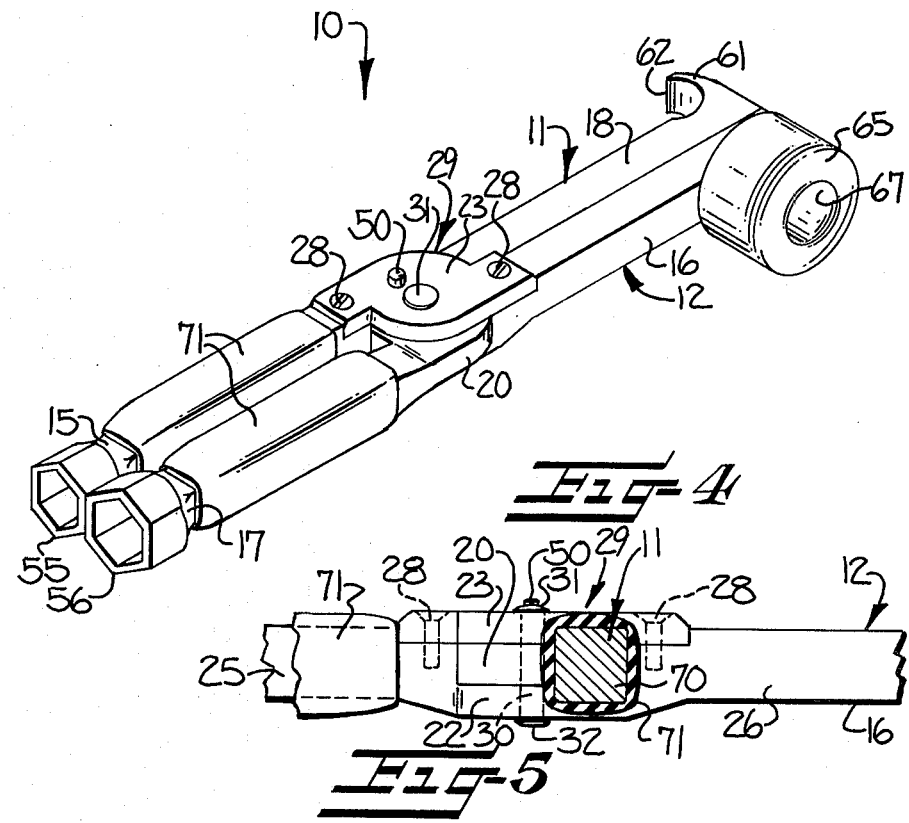
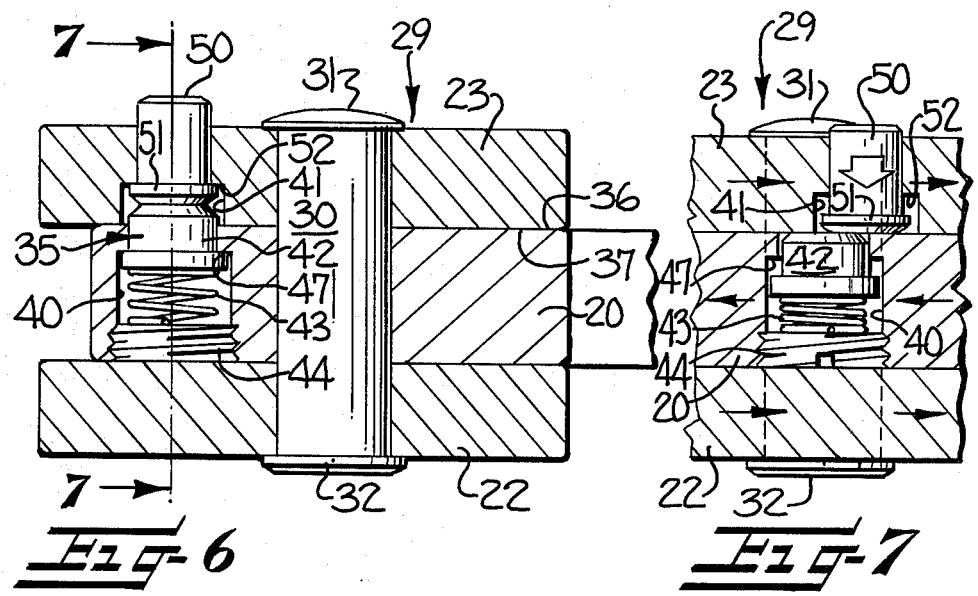

COLLAPSIBLE AUTOMOTIVE TOOL

FIELD OF THE INVENTION

The present invention relates to a tool for performing certain mechanical operations that are commonly associated with the removal and replacement of automotive tire and wheel assemblies or the like. More specifically, the invention concerns a collapsible tool that is suitable for rotating a threaded member, such as a lug nut, on a receiving threaded member, such as a wheel bolt, and which is adapted for removing and attaching a wheel cover to a wheel rim.

BACKGROUND OF THE INVENTION

It is well known that several mechanical operations must be performed in order to change a tire on an automobile or other similar vehicle. Typically, the wheel cover is detached from the wheel rim, the lug nuts are loosened, and after the vehicle is raised, the lug nuts are removed and the wheel assembly separated from its mounting. When the wheel assembly is to be returned or a replacement assembly mounted, the procedure is reversed. Thus, the assembly is placed on the mounting so that the wheel bolts extend through the holes in the wheel, the lug nuts are started and drawn tight on the wheel bolts, and after lowering the vehicle, the wheel cover is replaced. Essentially, these same operations are performed when the wheel assembly is removed and replaced for any other purpose in addition to changing the tire.

During the course of performance of these operations, several tools are generally employed, and particularly when the wheel assembly is not replaced in a shop or service station, the tools are manually operated rather than power driven. For example, a screwdriver is often used to pry the wheel cover from the rim by wedging its end between the cover and rim and levering the cover from its attached position. The wheel cover can then be replaced by holding the cover against the rim and hammering it in place with a rubber-headed mallet. The latter operation, however, is more often performed by hitting the wheel cover with the palm of the hand since rubber-headed mallets are not normally carried in vehicles for emergency or owner use.

In the absence of power driven tools, the lug nuts are ordinarily loosened and tightened with a wrench having at one end a socket which is adapted to receive lug nuts of the corresponding size. One commonly known wrench comprises four perpendicular arms which are rigidly secured to each other to form an X-shaped tool. The arms are generally provided with sockets of different sizes so that a standard lug nut can be turned on a wheel bolt by rotating the tool about the longitudinal axis of two opposing arms while retaining the lug nut in the socket of one of the opposing arms. This particular tool, however, provides only the means for removing or replacing lug nuts when changing the wheel assembly. Furthermore, its awkward size and configuration makes storage difficult, and therefore, the tool is not usually carried in the vehicle.

To alleviate the storage problem, there has been proposed a collapsible wrench which includes two arms that are pivotally joined at their centers in a crossing relationship. During usage, the arms are held in a perpendicular position for rotating the tool in the usual manner, and for storage, the arms can be brought together in substantially a parallel relationship. Typically, the arms are joined with a screw member or bolt which passes through the longitudinal center of the arms. A nut is then placed on the end of the bolt to secure the arms in the perpendicular position by clamping the arms together. The bolt furthermore provides means for transmitting torque between the members and is subject to a bending torque and tensile stress when applied to securely fastened lug nuts.

As illustrated in U.S. Pat. No. 3,587,366 to Klein, wrenches have been designed to reduce the bending torque applied to the joining bolt by introducing a coupling between the arms to distribute the torsional forces along the arms. However, even if the arms are securely fastened, stress is still applied to the bolt which can eventually break due to metal fatigue. In addition, it would appear that since the joining bolt and nut are repeatedly loosened and tightened, wear on the threads of the joining bolt would be inevitable.

To clamp the arms of typical collapsible wrenches, the operator must hold the two arms in position with one hand while operating the joining bolt and nut with the other. This presents not only a cumbersome and awkward operation, but also there is a danger that the operator's hand or fingers will be pinched by the closely positioned arms or associated joining members. Furthermore, since the joining bolt and nut are ordinarily retained in a loose position when not in use, it would appear that the arms could be easily disconnected and the components inadvertently misplaced.

SUMMARY OF THE INVENTION

Accordingly, it is an object of the invention to provide a collapsible tool for rotating a threaded member, such as a lug nut or the like.

Another object of the present invention is to provide a collapsible automotive tool which is characterized by the ability to perform a number of mechanical operations commonly associated with the removal and replacement of an automobile tire and wheel assembly. In this connection, it is also an object of this invention to provide a collapsible tool for removing and replacing wheel covers on automobile wheel rims and for removing and replacing lug nuts so as to mount or change an automobile tire and wheel assembly.

It is a further object of the present invention to provide an automotive tool which is readily collapsible and which can be automatically locked into its operative position for rotating threaded members.

These and other objects and advantages of the present invention are achieved in the embodiment illustrated herein by the provision of a collapsible tool which comprises a pair of elongate arms pivotally mounted to each other at substantially their longitudinal centers and in a crossing relationship. Thereby, the arms can be selectively rotated about the pivotal axis between a substantially parallel closed position and a perpendicular open position. On one end of one of the arms is mounted means for releasably engaging a threaded member, whereby the threaded member can be rotated by rotating the tool about the longitudinal axis of the arm when the arms are in their open position. In the preferred embodiment, a hammer head is mounted to a second end of the arms and faces perpendicular to its associated arm and in alignment with a common plane in which the arms pivot. Thus, the arms can be placed in the closed position and the tool used as a hammer. Also in the preferred embodiment, an arcuately curved claw is mounted to a third end of the arms to remove wheel covers or the like. The preferred embodiment further includes manually releasable spring detent means which communicates between the arms to automatically lock the arms in the open position when the arms are provided from the closed position to the open position.

BRIEF DESCRIPTION OF THE DRAWINGS

Some of the objects and advantages of the invention having been stated, others will appear as the description proceeds, when taken in connection with the accompanying drawings, in which—

FIG. 1 is a perspective view of a tool embodying the features of the present invention and illustrating the arms of the tool in their open position;

FIG. 2 is an exploded perspective view of the tool shown in FIG. 1;

FIG. 3 is a sectional view of the hammer head and taken substantially along the line 3—3 of FIG. 1;

FIG. 4 is a perspective view of the tool and illustrating the arms of the tool in their closed position;

FIG. 5 is a sectional view of the arms of the tool taken substantially along the line 5—5 of FIG. 1;

FIG. 6 is an enlarged sectional view of the spring detent means taken substantially along the line 6—6 of FIG. 1 and showing the position of the detent means when the arms are in their open position; and FIG. 7 is an enlarged sectional view of the spring detent means taken substantially along the line 7—7 of FIG. 6, but with the arms moved slightly toward the closed position.

DESCRIPTION OF THE ILLUSTRATED EMBODIMENT

Referring more specifically to the drawings, the illustrated embodiment of the collapsible tool is indicated generally at 10 and will be seen to include a pair of elongate arms 11 and 12, each having opposite ends to define a total of four arm ends 15, 16, 17 and 18. The arms 11 and 12 are pivotally mounted to each other at substantially the longitudinal center of each arm and in a crossing relationship. Thereby, the arms 11 and 12 can be selectively rotated about the pivotal axis between a substantially parallel closed position, as illustrated in FIG. 4, and a perpendicular open position as shown in FIG. 1.

In the preferred embodiment there is provided means for pivotally interconnecting the arms 11 and 12 so that the pivotal movement between the open and closed positions is within a common plane. More particularly, the first of the arms 11 includes a generally flat medial portion 20 which is received in a slot-like opening in the second arm 12. The slot-like opening extends through substantially the longitudinal center of the arm 12, and is formed by the space between an offset midsection 22 and a retainer plate 23 that interconnects the portions 25 and 26 of the arm 12 which are adjacent the arm ends 15 and 16. Fasteners 28 mount the plate 23 to the arm portions 25 and 26. Also, the medial portion 20 and 29 of each arm 11 and 12 respectively extends in a direction generally transverse to the overall longitudinal direction of the arm, and such that the arms in their closed position collectively have an H-like configuration in plan view.

The arms 11 and 12 are interconnected by a pivot pin 30 which extends transversely across the slot-like opening and through the medial portion 20 of the arm 11. As illustrated in FIG. 6, the pivot pin 30 can be of the rivet type which extends through the plate 23 and the midsection 22 and which is held in place by enlarged heads 31 and 32. In the alternative, a bolt with a locked nut could be employed to the same effect. The pivot pin 30 ordinarily will not be subject to a bending torque or tensile stress when the tool 10 is used as a wrench in the usual manner and as further explained below. Rather, torque is distributed along the medial portions 20 and 29 of the arms 11 and 12 when a rotational force is transmitted from one arm to the other.

Communicating between the arms 11 and 12, is included manually releasable spring detent means 35 for automatically locking the arms in the open position when they are pivoted from the closed position to the open position. For this purpose, each arm 11 and 12 includes a planar bearing surface 36 and 37 respectively substantially at the longitudinal center of each arm and disposed perpendicular to and including the pivotal axis. The bearing surfaces 36 and 37 are also disposed in an overlying face to face arrangement and rotatably slide with respect to each other during pivotal movement of the arms 11 and 12.

As best shown in FIGS. 6 and 7, a first opening 40 communicates with the bearing surface 36 of the arm 11 and extends in a direction parallel to the pivotal axis. A second opening 41 in the arm 12 communicates with the opposing bearing surface 37 of the arm 12 and also extends in a direction parallel to the pivotal axis. The openings 40 and 41 are positioned so as to be in axial alignment with each other when the arms 11 and 12 are disposed in the open position, note FIG. 6.

The spring detent means 35 also includes a locking pin 42 which is received in the first opening 40, and means mounting the locking pin within the first opening for movement between a retracted position disposed wholly within the first opening and an extended position extending outwardly from the bearing surface 36 of the arm 11. To facilitate movement from the retracted to the extended position, there is included means for resiliently biasing the locking pin 42 toward the extended position. In the preferred embodiment, the means for biasing the pin 42 comprises a coiled spring 43 positioned between one end of the locking pin and a set screw 44. A shoulder 46 on the pin 42 adjacent the spring 43 and an associated shoulder 47 within the first opening 40 engage to prevent the pin from escaping entirely from the confines of the first opening when in the extended position.

When the arms 11 and 12 are in the closed position or in transit between the open and closed positions, the pin 42 is in its retracted position. The bearing surface 37 of the arm 12 holds the pin 42 within the first opening 40, and the pin slides on the bearing surface 37 during pivotal movement. When rotated to the open position, however, the pin 42 enters the second opening 41 as shown in FIG. 6. Thereby, the arms 11 and 12 are automatically locked in the open position and further relative rotational movement is precluded.

In the preferred embodiment, the arms 11 and 12 are released from the locked open position by a manually operable release button 50 which is positioned within the second opening 41 in the arm 12. The second opening 41 extends through the plate 23 so that one end of the button 50 projects outwardly from the arm 12. The other end of the button 50 includes an enlarged head 51 adjacent the bearing surface 37 of the arm 12 and contacts the pin 42 when in the open position. Shoulder means 52 within the second opening 41 engages the enlarged head 51 and thus, retains the button 50 against outward movement in a direction away from the bearing surface 37 of the arm 12. Thereby, the button 50 is retained for movement between the shoulder means 52 and the bearing surface 36 of the arm 11. When the arms 11 and 12 are moved to the open position, the entry of the locking pin 42 into the second 41 moves the button 50 into contact with the shoulder means 52.

To release the arms 11 and 12 from the open position, the operator depresses the button 50 and simultaneously moves the arms together. As shown in FIG. 7, the depression of the button 50 removes the pin 42 from the second opening 41 so that the bearing surfaces 36 and 37 can slide with respect to each other, and thereby the arms can be moved to the closed position.

As explained by the objects of the invention, the collapsible tool 10 is particularly adapted for automotive purposes and is characterized by the ability to perform a number of mechanical operations which are commonly associated with removing and replacing automobile tire and wheel assemblies. Therefore, at a first end 15 of one of the arms 12 is mounted means for releasably engaging a threaded member so that the threaded member can be rotated by pivoting the arms to their open position and rotating the tool 10 about the longitudinal axis of the arm 12 mounting the engaging means. In the preferred embodiment, the engaging means comprises a wrench implement or first socket 55 mounted to the first arm end 15. The first socket 55 receives a lug nut of corresponding size so that the nut can be rotated on an associated wheel bolt to mount the wheel. A second socket 56 for receiving a lug nut of a size different from that receivable in the first socket 55 is mounted to another arm end 17.

A socket adapter 58 is also provided and is adapted to be removably received in one of the first and second sockets 55 and 56. As shown in FIG. 2, the adapter 58 in the preferred embodiment includes a male end 59 of corresponding size to the second socket 56 to be received in the socket. The opposite end of the adapter 58 receives a lug nut of a size other than that received by the sockets 55 and 56. It may also be desirable to include other socket adapters or to mount sockets of other sizes to other arm ends so that greater utility may be made of the wrench function of the tool.

Since it is an object of the invention to provide a multi-purpose tool for changing tire and wheel assemblies and to provide a tool which can be carried in the automobile and used by the owner or during emergencies, other tool implements are also included. An arcuately curved claw 61 with a pointed edge 62 is mounted to a third arm end 18 and provides means for removing a wheel cover or hub cap. By wedging the pointed edge 62 between the wheel cover and the wheel rim, the cover can be pried from its attached position.

A hammer head 65, which is composed of hard rubber, is also mounted to the remaining arm end 16 and faces perpendicular to the second arm 12 in alignment with the common plane in which the arms 11 and 12 pivot. A bolt 66 received in a recessed aperture 67 in the head 65 engages a threaded aperture 68 in the second arm 12 to mount the head. In this manner, the arms 11 and 12 can be placed in the closed position to facilitate use of the tool as a hammer. The portions 25 and 70 of the arms 12 and 11 adjacent the arm ends 15 and 17, which are opposite the hammer head 65 when the arms are in the closed position, are parallel in the closed position and preferably in contact, to thereby function as a handle, and means for facilitating the manual gripping of the tool 10 are secured to those arm ends. In the preferred embodiment the means for facilitating gripping comprises rubber sleeves 71 which surround the arm portions 25 and 70.

Since the arms 11 and 12 are aligned in a common plane with the hammer head 65, the force applied by the tool 10 when used as a hammer is also within the common plane. Thus, the arms will not tend to pivot from the closed position or twist in the user's hand upon impact of the hammer head. Also, it will be seen that in the closed position, the portion 72 of the arm 11 is in contact with the portion 26 of the arm 12 along their full lengths, and the portion 72 is aligned behind the hammer head 65, whereby the impacting force imparted through the hammer head is enhanced. Furthermore, the rubber sleeves 71 absorb much of the shock, and the arm portions 25 and 70 are comfortable to grip for hammer usage. The hammer function provides a convenient means for attaching wheel covers to the wheel rims.

In the drawings and specification, there has been set forth a preferred embodiment of the invention, and although specific terms are employed, they are used in a generic sense only and not for purposes of limitation.

That which is claimed is:

1. A collapsible automotive tool characterized by the ability to perform a number of mechanical operations which are commonly associated with the removal and replacement of an automobile tire and wheel assembly, and comprising
    a pair of elongate arms, each having opposite ends to define a total of four arm ends, with one of said arms including a generally flat medial portion and the other of said arms including a slot-like opening receiving said medial portion of said one arm therethrough;
    means for pivotally interconnecting said arms at substantially the longitudinal center of each arm so that said arms are disposed in a crossing relationship and are selectively pivotable within a common plane for movement between a generally parallel closed position and a perpendicular open position, said interconnecting means comprising a pin extending transversely across said opening of said other arm and through said medial portion of said one arm;
    wrench implement means for releasably engaging a threaded fastener and mounted to a first one of said arm ends, so that the fastener can be rotated by pivoting the arms to their open position and rotating the tool about the longitudinal axis of said first arm end; and
    a hammer head mounted to a second one of said arm ends and facing in alignment with said common plane and perpendicular to its associated arm, whereby said arms can be placed in the closed position and so that the arm ends opposite said hammer head collectively function as a handle to facilitate use of said tool as a hammer.

2. The automotive tool as defined in claim 1 wherein said tool further includes means secured to the portions of said arms adjacent the two arm ends which are opposite said hammer head when said arms are in the closed position for facilitating the manual gripping of said tool when used as a hammer.

3. The automotive tool as defined in claim 1 wherein said tool further includes manually releasable spring detent means communicating between said arms for automatically locking said arms in the open position when said arms are pivoted from said closed position to said open position, whereby said arms will be automatically locked in the open position when pivoted thereto, and may be manually released from the open position to permit pivotal movement to the parallel closed position.

4. The automotive tool as defined in claim 1 wherein said wrench implement means comprises a first socket for receiving a lug nut.

5. The automotive tool as defined in claim 4 wherein said tool further includes an arcuately curved claw having a pointed edge and mounted to a third one of said arm ends for removing wheel covers or the like.

6. The automotive tool as defined in claim 5 wherein said tool further includes a second socket mounted to a fourth one of said arm ends for receiving a lug nut of a size different from that receivable in said first socket.

7. The automotive tool as defined in claim 6 wherein said tool further includes a socket adapter adapted to be removably received in one of said first and second sockets and for receiving a lug nut of a size different from that receivable in each of said first and second sockets.

8. A collapsible automotive tool characterized by the ability to perform a number of mechanical operations which are commonly associated with the removal and replacement of an automobile tire and wheel assembly, and comprising a pair of elongate arms, each having a medial portion and opposite ends defining a total of four arm ends, and with the medial portion of each arm extending in a direction generally transverse to the overall longitudinal direction of the arm;

means for pivotally interconnecting said arms at substantially the longitudinal center of each arm so that said arms are disposed in a crossing relationship and are selectively pivotable within a common plane for movement between a generally parallel closed position wherein the arms collectively have an H-like configuration in plan view, and a perpendicular open position;

wrench implement means for releasably engaging a threaded fastener and mounted to a first one of said arm ends, so that the fastener can be rotated by pivoting the arms to their open position and rotating the tool about the longitudinal axis of said first arm end; and a hammer head mounted to a second one of said arm ends and facing in alignment with said common plane and perpendicular to its associateed arm, whereby said arms can be placed in the closed position and so that the arm ends opposite said hammer head collectively function as a handle to facilitate use of said tool as a hammer.

9. The automotive tool as defined in claim 8 wherein in the closed position, the arm end adjacent said second arm end is in contact therewith at a point behind said hammer head, whereby the impacting force imparted through the hammer head is enhanced during use of the tool as a hammer.

* * * * *